US012766425B2

(12) United States Patent
Singh et al.

(10) Patent No.: US 12,766,425 B2
(45) Date of Patent: Oct. 20, 2026

(54) TRIGGERING VIRTUAL HELP OR HINDRANCE BASED ON AUDIENCE PARTICIPATION TIERS

(71) Applicants: SONY INTERACTIVE ENTERTAINMENT LLC, San Mateo, CA (US); SONY INTERACTIVE ENTERTAINMENT INC., Tokyo (JP)

(72) Inventors: Lachmin Singh, San Mateo, CA (US); Celeste Bean, San Mateo, CA (US); Olga Rudi, San Mateo, CA (US); Katie Egeland, San Mateo, CA (US); Steven Osman, San Mateo, CA (US)

(73) Assignees: SONY INTERACTIVE ENTERTAINMENT LLC; SONY INTERACTIVE ENTERTAINMENT INC., Tokyo (JP)

( * ) Notice: Subject to any disclaimer, the term of this patent is extended or adjusted under 35 U.S.C. 154(b) by 107 days.

(21) Appl. No.: 18/917,167

(22) Filed: Oct. 16, 2024

(65) Prior Publication Data

US 2025/0032937 A1 Jan. 30, 2025

Related U.S. Application Data

(63) Continuation of application No. 17/828,974, filed on May 31, 2022, now Pat. No. 12,145,074.

(51) Int. Cl.
*A63F 13/86* (2014.01)

(52) U.S. Cl.
CPC .................................... *A63F 13/86* (2014.09)

(58) Field of Classification Search
CPC ....................................................... A63F 13/86
See application file for complete search history.

(56) References Cited

U.S. PATENT DOCUMENTS 7,446,772 B2 11/2008 Wong et al.
9,782,678 B2 10/2017 Long et al.
(Continued)

FOREIGN PATENT DOCUMENTS

CN 117138356 12/2023
EP 23816538.5 10/2024
(Continued)

OTHER PUBLICATIONS

PCT/US23/20990, International Search Report and Written Opinion dated Jul. 27, 2023.
(Continued)

*Primary Examiner* — Reginald A Renwick
(74) *Attorney, Agent, or Firm* — Kilpatrick Townsend & Stockton LLP

(57) ABSTRACT

The present disclosure generally relates to systems and methods to for encouraging spectator participation by permitting audience participation to provide different types of in-game help or hindrance to eSport players or teams when certain tiers or thresholds of spectator engagement are reached. In one example, a player's fanbase may cheer by pressing a button or providing other input/feedback. When a specific number of spectators or a level of participation is reached, a helpful object, power-up, or other in-game advantage may be given to the player. Conversely, a harmful item, loss of an object, or other in-game hindrance may be given to the player.

17 Claims, 6 Drawing Sheets

(56) References Cited

U.S. PATENT DOCUMENTS

| | | | | |
|---|---|---|---|---|
| 10,970,843 | B1 * | 4/2021 | Olsen | H04N 21/4316 |
| 11,524,234 | B2 | 12/2022 | Salik | |
| 12,064,690 | B2 | 8/2024 | Ikenaga et al. | |
| 12,145,074 | B2 | 11/2024 | Singh et al. | |
| 2006/0098013 | A1 | 5/2006 | Wong et al. | |
| 2009/0143141 | A1 | 6/2009 | Wells et al. | |
| 2010/0041457 | A1 | 2/2010 | Cook et al. | |
| 2011/0151974 | A1 | 6/2011 | Deaguero | |
| 2013/0324247 | A1 | 12/2013 | Esaki et al. | |
| 2014/0004951 | A1 | 1/2014 | Kern et al. | |
| 2015/0355826 | A1 | 12/2015 | Gibbons et al. | |
| 2015/0360133 | A1 | 12/2015 | MacCallum et al. | |
| 2016/0358082 | A1 | 12/2016 | Quintero | |
| 2017/0001111 | A1 | 1/2017 | Willette et al. | |
| 2018/0189077 | A1 | 7/2018 | Gupta et al. | |
| 2019/0046886 | A1 | 2/2019 | George et al. | |
| 2019/0118098 | A1 | 4/2019 | Payzer et al. | |
| 2019/0262723 | A1 | 8/2019 | Trombetta et al. | |
| 2020/0009458 | A1 | 1/2020 | Onda et al. | |
| 2020/0179809 | A1 | 6/2020 | Lin et al. | |
| 2021/0038998 | A1 | 2/2021 | Tallarico et al. | |
| 2021/0113926 | A1 | 4/2021 | Ziaja et al. | |
| 2021/0217245 | A1 | 7/2021 | Akman | |
| 2021/0241507 | A1 | 8/2021 | Kazem et al. | |
| 2021/0331072 | A1 | 10/2021 | Gibbon et al. | |
| 2021/0346811 | A1 | 11/2021 | Kahn et al. | |
| 2022/0054945 | A1 | 2/2022 | Salik | |
| 2022/0062778 | A1 | 3/2022 | Eatedali et al. | |
| 2022/0168639 | A1 | 6/2022 | Nelson et al. | |
| 2022/0203234 | A1 | 6/2022 | Olabode et al. | |
| 2022/0219091 | A1 | 7/2022 | Kumah et al. | |
| 2023/0381673 | A1 | 11/2023 | Azmandian et al. | |
| 2023/0381674 | A1 | 11/2023 | Singh et al. | |
| 2024/0024787 | A1 | 1/2024 | Bean et al. | |

FOREIGN PATENT DOCUMENTS

| | | | |
|---|---|---|---|
| JP | 2021104288 | A | 7/2021 |
| WO | WO 2023/235102 | | 12/2023 |
| WO | WO 2023/235103 | | 12/2023 |
| WO | WO 2024/019822 | | 1/2024 |

OTHER PUBLICATIONS

PCT/US23/20991, International Search Report and Written Opinion dated Jul. 28, 2023.

PCT/US2023/024036, International Search Report and Written Opinion dated Aug. 25, 2023.

U.S. Appl. No. 17/828,971, Office Action dated Sep. 13, 2024.

U.S. Appl. No. 17/828,974, Office Action dated Jul. 20, 2023.

U.S. Appl. No. 17/828,974, Final Office Action dated Feb. 29, 2024.

U.S. Appl. No. 17/870,021, Office Action dated Mar. 14, 2024.

U.S. Appl. No. 17/870,021, Final Office Action dated Jun. 24, 2024.

U.S. Appl. No. 17/870,021, Office Action dated Oct. 11, 2024.

EP23816538.5, "Extended European Search Report", Apr. 14, 2026, 9 pages.

* cited by examiner

TRIGGERING VIRTUAL HELP OR HINDRANCE BASED ON AUDIENCE PARTICIPATION TIERS

BACKGROUND OF THE INVENTION

1. Field of the Disclosure

The present disclosure generally relates to enhancing spectator engagement with of electronic sports (eSports). In particular, the present disclosure relates to systems and methods for spectators of eSports events to provide virtual assistance of hindrance to the players according to various participation levels.

2. Description of the Related Art

Playing video games in a competitive environment may be referred to as electronic sports or "eSports." Like non-electronic sports, the participants or competitors compete in matches and even tournaments of several matches. Such eSports matches and tournaments take place within in-game environments not only be accessible to the players themselves, but also to non-playing spectators. In some instances, eSports tournaments may be associated with in-person events similar to live sporting events, such as tailgate parties and other activities that engage a fan base. In addition, remote spectators may be provided with a digital media stream (e.g., live or recorded) of the eSports events.

Over time, eSports has grown into a large entertainment industry with millions of spectators. Despite this growth in viewership, eSports streams generally lack engagement enhancements for dedicated fans and viewers. In particular, spectators watching the event remotely may feel that they are unable to affect the players and outcomes in the same manner as those watching in person.

There is, therefore, a need to provide a more dynamic and engaging experience for spectators to participate and impact the eSports event.

SUMMARY OF THE CLAIMED DISCLOSURE

The present disclosure generally relates to a system for triggering the distribution of an in-game item to a player of an eSport event in response to spectator participation at an entertainment device. The system may include a server having memory and a processor that executes instructions stored in memory, wherein execution of the instructions by the processor causes the server to receive event data from an eSport event server and initiate a group participation activity. The group participation activity defines a threshold for a group participation response. The processor is also configured to receive the group participation response from the entertainment device, determine if the group participation response exceeds the threshold, distribute an in-game item to the player wherein the group participation response exceeds the threshold, and store data regarding the distributed item to the eSport event server.

The present disclosure also relates to a method for triggering distribution of an in-game item to a player of an eSport event in response to spectator participation at an entertainment device. The method includes, at a computing device having a processor and a memory, receiving event data from an eSport event server and initiating a group participation activity. The group participation activity defines a threshold for a group participation response. The methods also includes receiving the group participation response from the entertainment device, determining if the group participation response exceeds the threshold, distributing an in-game item to the player wherein the group participation response exceeds the threshold, and storing data regarding the distributed item to the eSport event server.

The present disclosure also relates to a non-transitory computer-readable storage medium, having embodied thereon a program executable by a processor to perform a method for triggering distribution of an in-game item to a player of an eSport event in response to spectator participation at an entertainment device. The method includes, at a computing device having a processor and a memory, receiving event data from an eSport event server and initiating a group participation activity. The group participation activity defines a threshold for a group participation response. The methods also includes receiving the group participation response from the entertainment device, determining if the group participation response exceeds the threshold, distributing an in-game item to the player wherein the group participation response exceeds the threshold, and storing data regarding the distributed item to the eSport event server.

DETAILED DESCRIPTION

Figure 1:
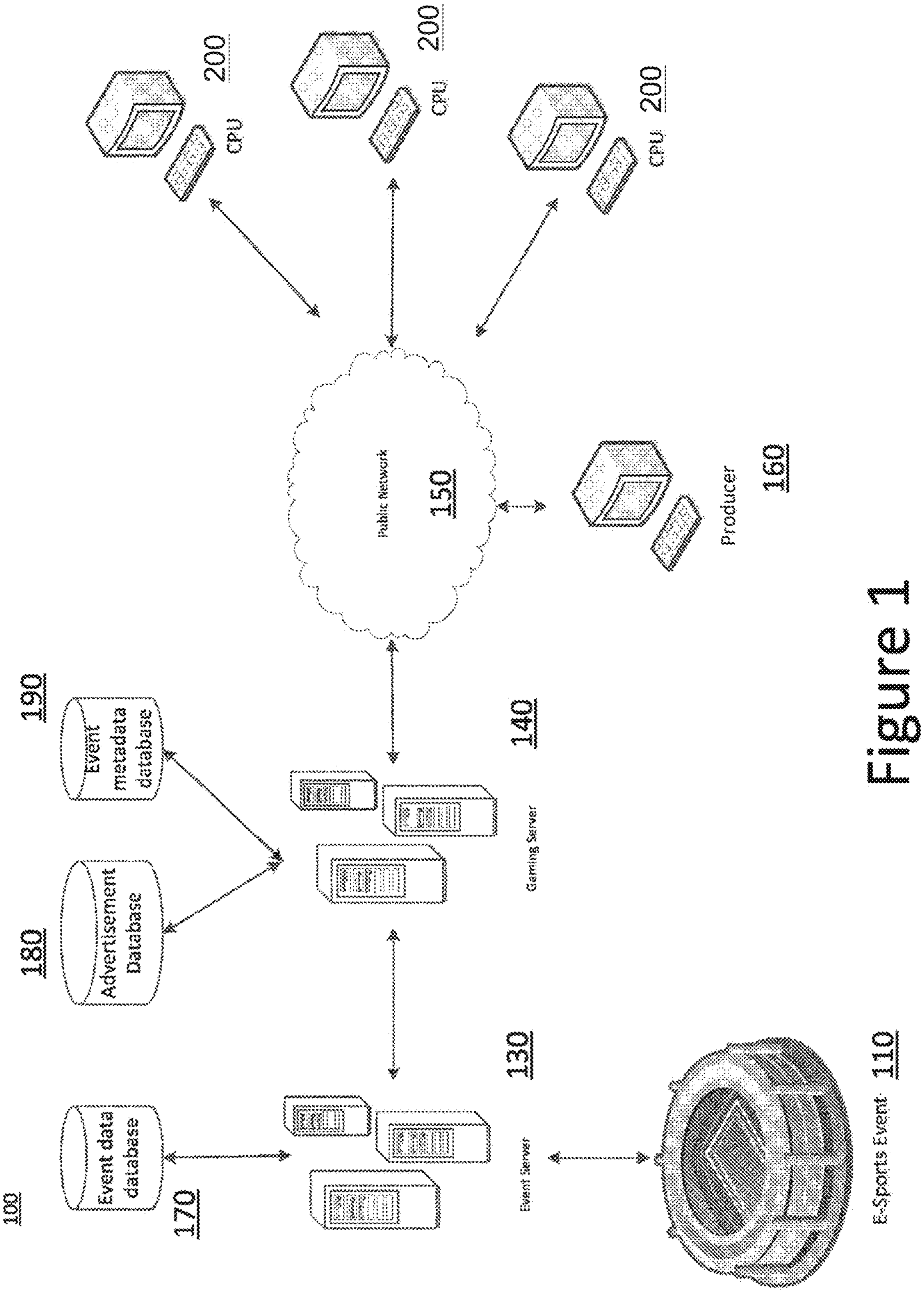
FIG. 1 illustrates an exemplary network environment in which a system for dynamically defining and customizing digital streams may be implemented.

The present disclosure describes methods and systems for dynamically defining and customizing digital streams. Instead of merely distributing the same digital stream of an eSports event (e.g., match or other tournament-related event) to all remote spectators-whether as a real-time stream for live spectating or as a recorded stream for later viewing on demand-various features associated with eSports gaming network may be used to customize the display of the eSports events with a stream, for example, to promote a more immersive or otherwise engaging viewer experience. In addition, such customization techniques described herein can also be provided to typical digital media distribution of any event, including non-eSports events.

As referred to herein, an eSports event is inclusive of any type of event associated with eSports play and tournaments, including the actual competitive matches involving a number of different video game competitors and affiliated events. Depending on the parameters of the tournament, the video game(s) involved can include a wide variety of genres and game titles. Some tournaments are further associated with affiliated events, which may take place in in-person settings, as well as digital settings. Thus, spectators can attend and view live eSports events much like other typical sports (e.g., football, basketball) in designated arenas or stadiums. Spectators can also view these eSports events remotely via streams distributed to their respective computing devices for display.

Embodiments of the present invention may further incorporate and automate features to dynamically define and customize a stream to provide an immersive or otherwise engaging experience corresponding to how traditional sporting events (e.g., football) are filmed, produced, and distributed to remote viewers. Thus, a digital stream may be dynamically defined to include implementation of unique views, behind-the-scenes perspectives, etc. Furthermore, some embodiments of the present invention may include further customizing a stream to include views of particular interest to a user or group of users (e.g., based on various viewer preferences, actions, and other data).

According to various aspects, the disclosed systems and methods are used to help or hinder the player's playing in an eSports tournament or event, based in part on the participation of spectators. The systems and methods may also be stored or encoded on non-transitory computer-readable storage medium.

As used herein, a "broadcast," "presentation," "data display," "event stream." or "data stream" may be used interchangeably to refer to the eSports presentation made available to spectators. An eSports match, for example, may further include a number of different streams, as well as different views or perspectives within a stream. As such, spectators have the option to obtain greater access to an increasing number of view streams, content, views, or perspectives within an eSports tournament.

According to one aspect, spectators may become more engaged in the eSport event by aiding their favorite players or teams or conversely hindering the opposition through group participation activities.

For example, when the number of spectators participating in a group participation activity on behalf of Team 1 or a favorite player exceeds a certain threshold, then Team 1 or that player is rewarded. The rewards may range from simple cheering and emotes to helpful items, power-ups, or other advantages that may greatly affect the outcome of the game. The various rewards increase in beneficial effect and are awarded based upon exceeding certain participation tiers, such that greater spectator participation while result in better rewards for the players.

Conversely, according to another embodiment, when the number of spectators participating in a group participation activity on behalf of Team 1 exceeds a certain threshold, then Team 2 or another opposing team may be hampered. For example, opposing team may be hampered by booing or other signs of displeasure, losing items, to decreases in player character attributes, among others. Similarly, in other embodiments, spectators may participate in group participation activities to actively oppose one or more teams or players, such that they may be hindered in response to the level of participation.

A system 100 for triggering virtual help or hindrance based on spectator participation during an eSports event is illustrated in FIG. 1. The system can be implemented through a wide variety of devices, displays and activities to engage and further entertain individual spectators of the eSports event. Similar to live sporting events, the system 100 would also facilitate group participation to engage and potentially impact the eSport event through group participation activities via the spectators' respective user computing devices 200.

As illustrated, the system 100 provides distribution of eSports event data from an eSports event 110 to various remote users or spectators on their respective computing devices 200. The distribution may include, for example, live streams from which remote spectators may view on their respective computing devices 200. The eSports event data from the eSports event 110 may be collected and processed at event server 130. The eSports event data from the eSports event 110 is then transmitted to the gaming server 140 that performs the modifications to the eSports event data. Described in further detail below, the modifications to the eSports event data at the gaming server 140 may include generating new, customized, and/or composite data streams in real time or near real time using the eSports event data.

After any numbers of modifications have been performed by the gaming server 140, the eSports event data can then be provided to the public network 150 where spectators on their computing devices 200 can receive and view the eSports event display. Exemplary computing devices 200 may include laptops, desktops, mobile devices, and tablets. The spectators may be able to download the eSports event data directly to their computing devices 200 using various software applications installed on the computing devices 200. In other situations, web-based applications or streaming services may provide user access to and viewing of the eSports event data. Spectators may then be able to view the eSports event data as a video stream inclusive of all the modifications such as statistics, commentators, crowd interactions, and advertisement added by the gaming server 140.

The event server 130 obtains eSports data from an eSports event 110. The eSports event 110 can be a video game competition held at a predetermined location such as an arena or stadium. The eSports event data obtained from the eSports event 110 would include videography and gameplay information associated with each of the video game competitors participating within the eSports event 110.

As an example, if the eSports event 110 were a tournament playing a head-to-head video game based on American football, baseball, or soccer, the eSports event data would be the gameplay data associated with each of the players during each game. The gameplay data being obtained from the eSports event 110 may include video gameplay information associated with each player's individual interactions with respect to the videogame such as each player's point of view as they play the game and game state within the video game at any given moment in time. The gameplay data may also include different player's inputs (e.g., keyboard and mouse inputs) and communications (e.g., voice and text chat) between teammates or opponents during the course of the match as well. The event server 130, in the process of obtaining gameplay data for each player, can also obtain video recordings of each player during the course of the match. The video recordings may be recordings of each player's screen as the video game match is occurring. The video recording may also be an in-game perspective of the video game match using features (e.g., spectator camera perspectives) associated with the video game. This video data can be provided to the gaming server 140 to be used in the distribution of the eSports event (or used to supplement rendered gameplay video from the gaming server 140) sent to the spectators on their computing devices 200.

The event server 130 may also be capable of obtaining additional information related to the video game being played during the eSports event 110. For example, microphones, cameras, and/or sensors may be used to capture information about the audience attending the live eSports event 110. Furthermore, any audio and video related to on-site commentators can also be captured by the event server 130. Additionally, the gameplay data captured by the event server 130 may also include additional points of view that could be available or otherwise generated during the game, even those not selected by the player. For example, if Player A prefers to play using a third-person point of view, the game data for various first person points of view may also be received at the event server 130. These alternate points of view, including other first person points of views or third person points of views, among others, ordinarily generated by the game, may be captured by the event server 130 for subsequent distribution, manipulation, or storage by the gaming server 140.

The event server 130 can store the information obtained from the eSports event data in an event database 170. The event database 170 may be used to store the video data as well as any gameplay information retrieved from the event server 130. The information stored within the event database 170 can be accessed by the gaming server 140.

The gaming sever 140 generates the eSports event data that will be distributed to spectators on their computing devices 200. The distribution of eSports event data may generally include a video recording of the eSports event 110 along with additional information and commentary aimed at immersing the user when viewing the eSports event. The video recording may be obtained directly from the eSports event 110 via the event server 130. It may also be possible for the gaming server 140 to re-render game states of the video game using the extract gameplay data from the event server 130. For this situation, the gaming server 140 may retrieve stored video game assets associated with the video game of the eSports event 110. By using the extracted gameplay data and the stored video game assets, the gaming server 140 may be able to re-create or generate customized video of the video game as if it was recorded directly via the gaming server 140.

The gaming server 140, using the eSports event data coming from the event server 130, can then extract relevant information the eSports data streams that spectators will view on their computing devices 200. The types of extracted information obtained by the gaming server 140 can be the information that spectators may find interesting.

In yet another aspect, the gaming server 140 is capable of using the collected information from the eSports event from the different players in order to reconstruct a unique view if such view is not available within the video game. This may be done by using the collected information from the event server 130 and the stored game assets available to the gaming server 140. The gaming server 140 may be able to re-render what the state of the video game at a given point in time and then focus re-rendering certain portions based on the desired focus. This allows the gaming server 140 to provide a different (and possibly comprehensive) view of the video game using all the information available in situations where only partial information may be known by each individual participant (e.g., eliminating "fog of war" effects) . In various aspects, the gaming server 140 generates or renders exclusive video or data streams that may not be produced by the eSports producer.

The public network 150 facilitates communication of the eSports event data from the gaming server 140 with the plurality of user computing devices 200. The public network 150 can also include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between user devices connected through a network service provider. Examples of network service providers include the public switched telephone network, a cable service provider, a provider of digital subscriber line (DSL) services, or a satellite service provider.

Producers 160 are also able to affect how the distribution of the eSports event data is performed. Producers 160 are able to interact with the event server 130 and gaming server 140 using their respective computing devices. For example, producers 160 may create, run, and manage the eSports event. Furthermore, modifications to how the distribution of the eSports event data are sent to the remote spectators on their computing devices 200 can also be implemented by the producers 160 such as identifying what additional video streams should be incorporated and what additional information (e.g., statistics) should be shown during the distribution of the eSports event data. The Producers 160 may also select a particular video stream of the multitude of video streams available for broadcast or streaming.

The event data database 170 may be associated with the event server 130 and used to store the eSports event data obtained from the eSports event 110. The event server 130 may be capable of obtaining a variety of different types of eSports event data from the eSports event 110 inclusive of video recordings, audio, and text-based information. As previously indicated, the event data database 170 may store additional video stream views or perspectives of the game not selected by the players.

The eSports event data obtained from the eSports event 110 can be subsequently stored in the event data database 170. In some situations, the information stored in the event data database 170 can be accessed at a future time and date for viewing a previously eSports event on-demand after the live event has been completed. Although the event server 130 can directly transmit the eSports event data obtained from the eSports event 110, it may also be possible that the gaming server 140 access the event data database 170 for some or all the information that will be distributed to the spectators.

The video stream database 180 is used to store a plurality of different video streams, including the data streams of the eSports event data being provided to the various spectators, by the gaming server 140.

The event metadata database 190 is used to store the metadata associated with the eSports event streams being provided to the user computing devices 200. The gaming server 140 can generate the metadata to indicate what additional information or views can be incorporated with an event data stream for a particular spectator. The metadata is associated with the streams so that additional views available or the option to generate a customized view that may be used in one or more group participation activity. The metadata can also be used to link spectator participation, spectator reactions or other inputs at the spectator computing devices 200 to track previous participation activities that may be viewed as a help or hindrance by the players as identified through machine learning.

Each metadata generated by the gaming server 140 may be assigned a unique identification that is linked with eSports event data used in a stream and/or a unique user identification. Because the metadata is uniquely identified to be associated with event data and/or a unique user and is used to indicate where and when the additional information is incorporated into the event data stream, it is not necessary for the gaming server 140 to store multiple entire event presentations including the additional information obtained from the eSports event 110 or multiple instances of the same user-created views. Instead, whenever eSports event data is used in a stream, the corresponding metadata associated with the eSports various view streams can be retrieved from the event metadata database 190 via the gaming server 140 querying the event metadata database for any relevant metadata.

Figure 2:
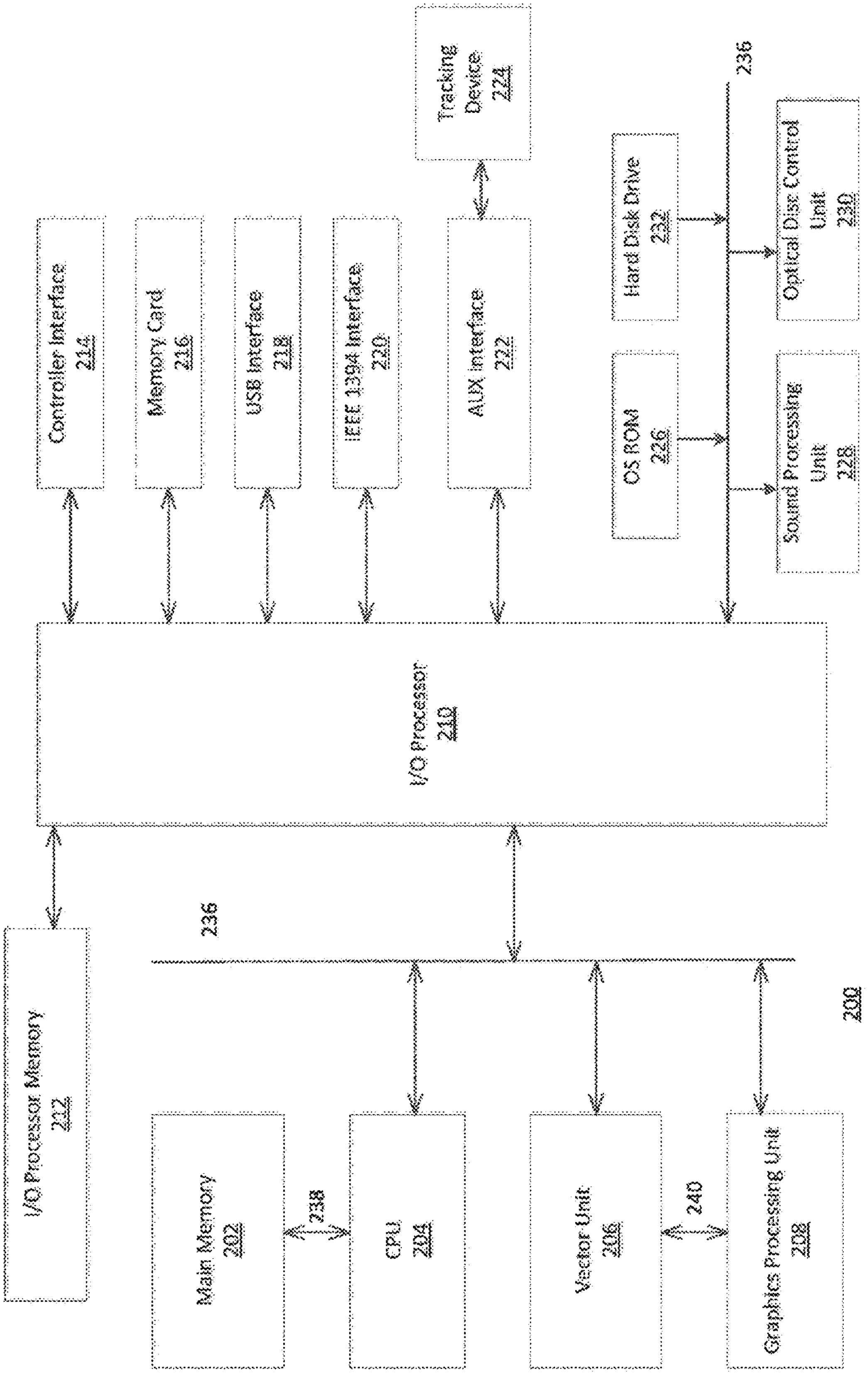
FIG. 2 is an exemplary user device that may be used in context of the system of FIG. 1.

FIG. 2 is an exemplary user device 200 that may be used in context of the system of FIG. 1. The user computing device 200 may correspond to user computing device 200 of FIG. 1 and may be inclusive of desktop, laptop, tablet, mobile device, console gaming system, such as Playstation® 4 or Playstation® 5 etc. The user computing device 200 is a device that the user can utilize to facilitate carrying out features of the present disclosure pertaining to the dynamic and customized engagement and views for the eSports event. In particular, the user computing device 200 allows the user to view the distribution of eSports event data remotely. The user computing device 200 would facilitate the user viewing of the eSports event data via a display associated with the user computing device 200.

The user computing device 200 may include various elements as illustrated in FIG. 2. It should be noted that the elements are exemplary and that other aspects may incorporate more or less than the elements illustrated. With reference to FIG. 2, the user computing device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE interface 220, an auxiliary (AUX) interface 222 for connecting a tracking device 224, although other bus standards and interfaces may be utilized. The user computing device 200 further includes an operating system read-only memory (OS ROM) 226, a sound processing unit 228, an optical disc control unit 230, and a hard disc drive 232, which are connected via a bus 234 to the I/O processor 210. The user computing device 200 further includes at least one tracking device 224.

The tracking device 224 may be a camera, which includes eye-tracking capabilities. The camera may be integrated into or attached as a peripheral device to user computing device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the spectator looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the spectator is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as Hz, which is needed to capture detail of very rapid eye movement.

A range camera may instead be used with the present disclosure to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user computing device 200 that captures voice data. The microphone may conduct acoustic source localization and/or ambient noise suppression. The microphones may be usable to receive verbal instructions from the user to schedule, retrieve, and display content on the user computing device 200.

Alternatively, tracking device 224 may be the controller 902 of the user device 200. The controller may use a combination of built-in accelerometers and infrared detection to sense its position in 3D space when pointed at the LEDs in a sensor nearby, attached to, or integrated into the console of the entertainment system. This design allows spectators to control functionalities of the user computing device 200 with physical gestures as well as button-presses. The controller connects to the user computing device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user computing device 200 may be an electronic gaming console. Alternatively, the user computing device 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device. For example, the vector unit 206 may transform objects from three-dimensional coordinates to two-dimensional coordinates and send the two-dimensional coordinates to the graphics processing unit 208. Furthermore, the sound processing unit 230 executes instructions to produce sound signals that are outputted to an audio device such as speakers (not shown).

A user of the user computing device 200 provides instructions via the controller interface 214 to the CPU 204. For example, the user may instruct the CPU 204 to store certain information on the memory card 216 or instruct the user device 200 to perform some specified action. Example controllers associated with the controller interface 214 may include a touchscreen, keyboards, and game controllers.

Other devices may be connected to the user computing device 200 via the USB interface 218, the IEEE interface 220, and the AUX interface 222. Specifically, a tracking device 224, including a camera or a sensor may be connected to the user computing device 200 via the AUX interface 222, while a controller may be connected via the USB interface 218. In some aspects, a VR headset or related hardware equipment may be communicatively coupled to computing device 200 via one or more computing interfaces. Hardware and related software for implementing an augmented reality (AR) experience may similarly be coupled to computing device 200 via one or more computing interfaces.

Figure 3:
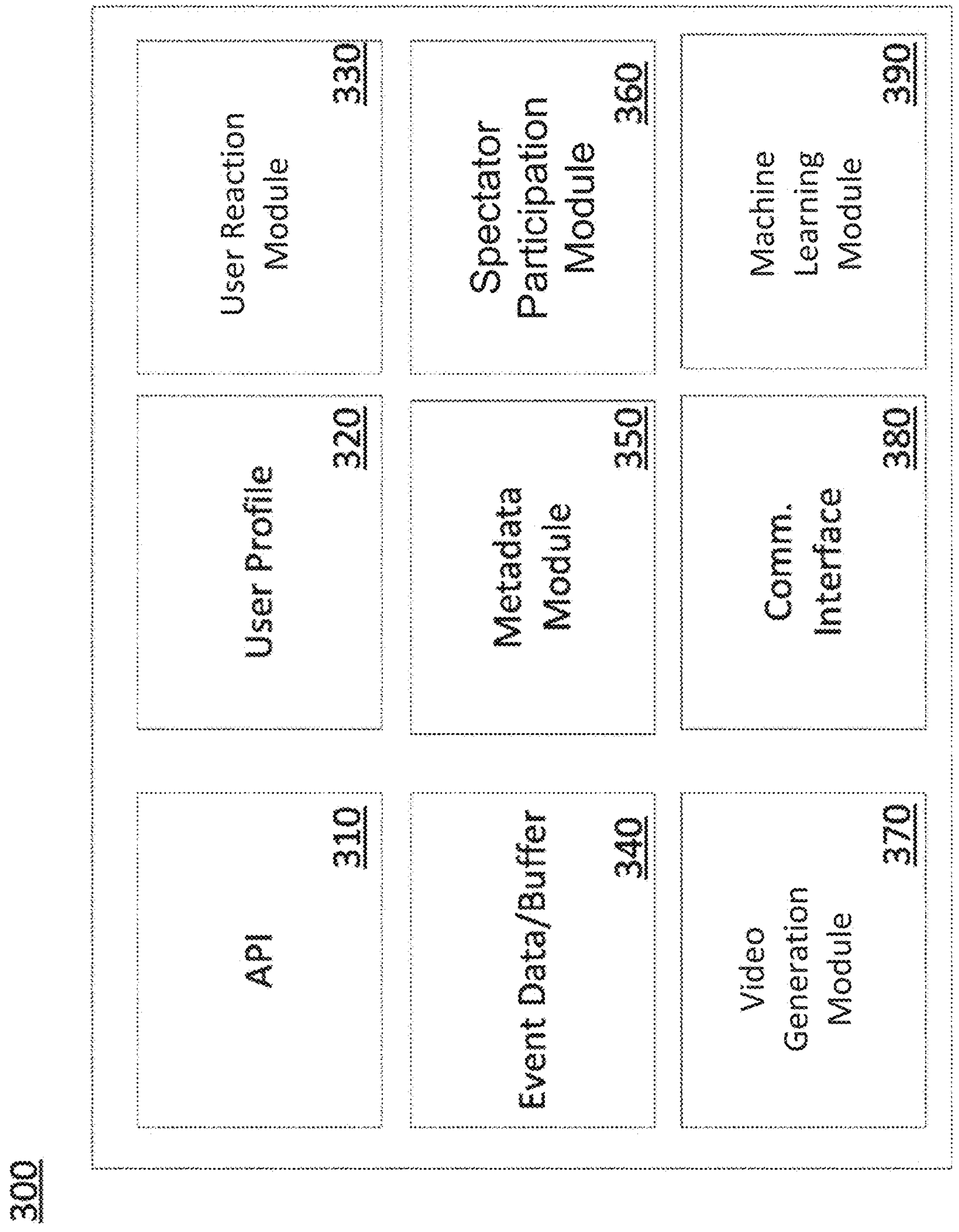
FIG. 3 is a block diagram of an exemplary gaming server that may be used in context of the system of FIG. 1.

FIG. 3 is a block diagram of an exemplary gaming server 300 that may be used in context of the system of FIG. 1. The gaming server 300 may corresponding to gaming server 140 of FIG. 1 and include a plurality of different features that facilitates the dynamic and customized engagement and views in an eSports event. As illustrated in FIG. 3, the gaming server 300 may include an application program interface (API) 310, user profiles 320, a user reaction module 330, eSports event data storage and buffer 340, metadata module 350, a spectator participation module 360, a view generation module 370, communication interfaces 380, a machine learning module 390. Details regarding each of these features will be provided below in further detail.

The application program interface (API) 310 allows an entity to manage how eSports event data is distributed to remote spectators. Using the API 310, an administrator (e.g., developer, tournament organizer) can customize and modify how the gaming server operates with respect to what data is retrieved from the event server, what data is processed and generated from the event server, and how the eSports event data is distributed to the remote spectators. For example, the administrator (through the use of the API 310 can create and/or modify the information associated with the various user profiles 320 and user reaction module 330 that indicate the types of additional or substitute content that will be implemented into the distribution of the eSports event data to the remote spectators.

Furthermore, any updates needed with respect to the features associated with the gaming server can be implemented using the API 310 as well. For example, various video games may obtain patches and or other fixes during the course of an eSports event or between eSports events. The API 310 can be used to modify data generated or used by the spectator participation module 360 to incorporate those patches and other fixes as well.

The user profile 320 is used to store information about each remote spectator. Remote spectators may need to create their own profile and sign in to their respective profiles before being allowed to access/view eSports event data. The user profiles 320 would be used by the gaming server 300 to identify the types of modifications to the eSports event stream that can be carried out to better immerse the user in the viewing experience.

The user profile 320 may also store user preferences about the distribution of the eSports event data being remotely viewed on their user computing device. For example, the user profile 320 can customize preferred views, preferred additional information to be displayed, preferred audio, and even which group participation activities in which the spectator is most likely or least likely to engage. For example, when the spectator streams an eSports event for a particular genre, the user profile 320 may be referenced to determine that the spectator is most active or engaged in the first 5 minutes of an event. The user profile 320 can be updated anytime by the respective user through their user computing device.

The user profile 320 can also store information about the user computing devices. This information can be used by the gaming server 300 to identify how the eSports event data can be processed and transmitted. This may identify, for example, the format the eSports event data would need to be transmitted in order to be compatible with the user computing device. With all the information about the user stored in the user profile 320, the gaming server 300 would be able to identify the appropriate version of the eSports event data to be distributed.

The user reaction module 330 receives and processes spectator-generated content related to a spectator's reaction to the eSport event. The reactions may also include physical movements or facial expressions captured by the tracking device 224. During viewing of the eSport event, the user reaction module 330 captures data from the spectator's respective client devices 200. In one aspect, the spectator reaction module 320 may identify a type of reaction made by the spectator and classify the same as joy, intrigue, or outrage, among others.

The user reaction module 330 may capture a spectator's physical response to gameplay, commentary, or a group participation activity provided during the eSport event. In particular, various hardware sensors, including but not limited to the tracking device 224 may detect user motion in a variety of ways. In one example, a camera may record facial expressions, hand gestures, full body motions and other body language made by the spectator in response to a pending group activity prompt. In another example, a microphone may record user speech in response to an activity, including but not limited to cheering or booing. In yet a different example, a haptic feedback device or gyroscope embedded in a controller may receive rapid changes in input associated with banging, throwing, shaking, or otherwise motions and inputs associated with rooting for or against players or teams in the eSport event.

The eSports event data storage and buffer 340 is used to store eSports event data coming from the event server. The eSports event data storage and buffer 340 may be used to store the eSports data temporarily until it can be processed and used in the distribution of the eSports event data.

The metadata module 350 generates metadata for the eSports event data being distributed to the remote spectators on their computing devices. The generated metadata identifies the types of information to be incorporated into the distribution of the eSports event data as well when that information should be presented.

The metadata generated by the metadata module 350 is uniquely associated with the distribution of the eSports event data. This can be performed, for example, by providing unique labels that connect one with the other. In this way, the eSports event data used in distribution to the remove spectators can be stored separately from the metadata that is generated. However if the eSports event data is ever retrieved and viewed by the user, the corresponding metadata can be queried and applied accordingly.

The spectator participation module 360 may be stored on and executed from the event data database 170, the user devices 200, the event servers 130 or the gaming servers 140. The spectator participation module 360 is engaged by a spectator on a user device 200, that may include, according to various embodiments, a digital display 244 such as a television, projector, monitor, smartphone, virtual reality (VR) head-mounted display or handheld device and may incorporate one or more physical input devices such as a touchscreen, remote, controller, joystick, or mouse and keyboard. Further, data associated with the spectator's user profile may be relevant to spectator participation. For example, the user profiles may also contain and store historical user data, favorite team preferences, favorite player preferences, and preferences for information delivered by the spectator participation module 360.

Figure 6:
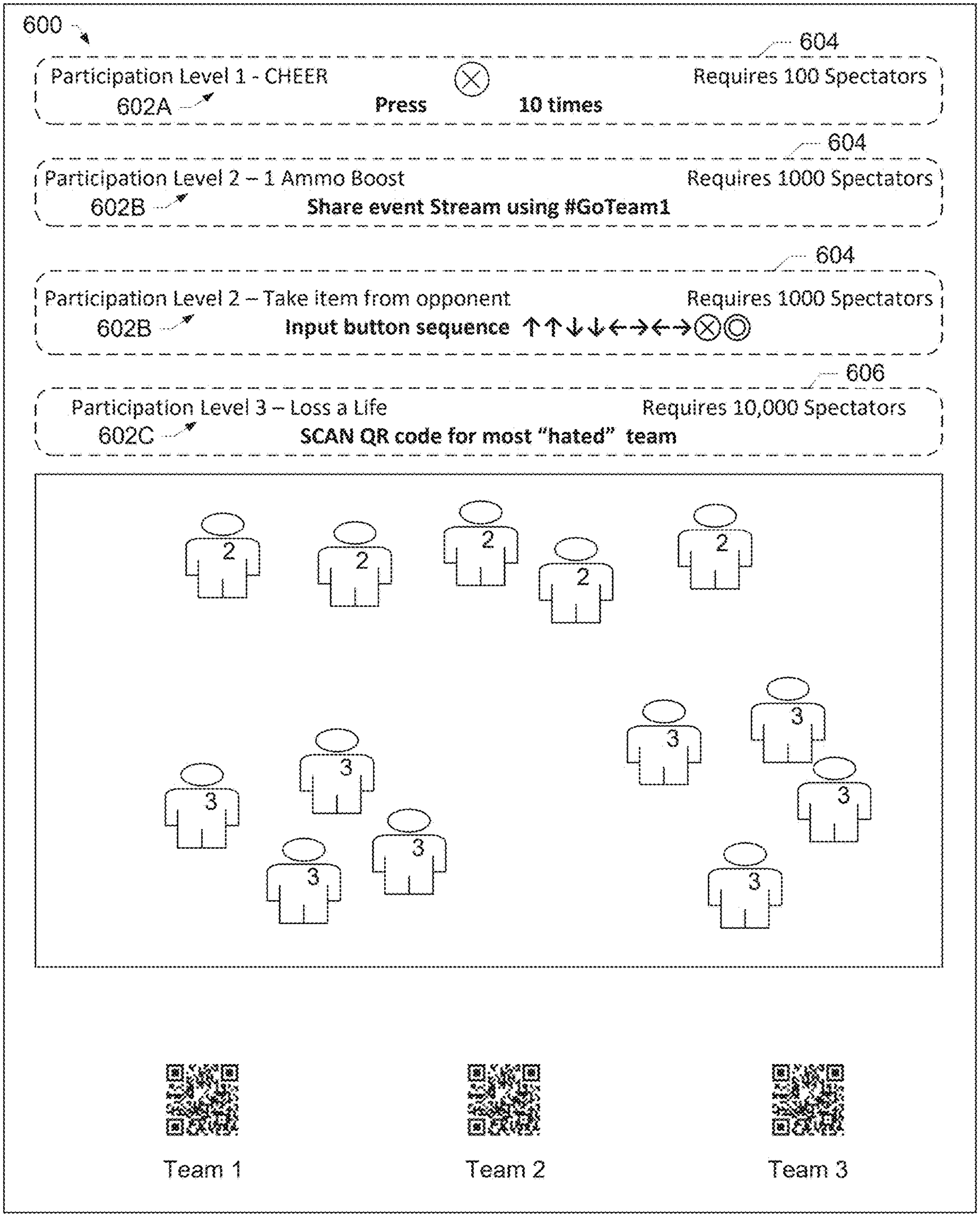
FIG. 6 is an example illustration of a display during an eSport event displaying group participation activities, according to one embodiment.

According to one embodiment, the spectator participation module 360 may establish group participation tiers, generally indicated as 602A-602C in FIG. 6, in for each player or team in the eSport event. The group participation tiers 602A-602C establish thresholds for the number of unique spectators that must participate to trigger an in-game effect, whether a help or a hindrance. Furthermore, the group participation tiers may further define individual spectator participation tiers that establish thresholds for the number of actions or inputs that must be performed by each spectator to count towards the group participation goal. By way of example, the group participation tiers may establish thresholds of 1, 5, 10, 25, 50, 100, 500, 1000, 10,000, 100,000 spectators or more. In other aspects, the group participation tier thresholds may be set to any number of spectators. Similarly, the spectator participation tiers may establish thresholds of any number of actions or inputs to be performed by each spectator. Accordingly, the tier thresholds and corresponding rewards of hindrances for both group and spectator participation may be established before the eSport event and/or may be modified during the event in response to various factors, including but not limited to the number of spectators for the event, gameplay during the eSport event, or the results of portions of the eSport event.

The machine learning module 390 may be an internal or external artificial intelligence (AI) or other machine learning system trained using any suitable machine learning model, system, or dataset to predict or identify likely user preferences and likely actions in the video game, among others. The machine learning module may work in conjunction with the video generation module 370 to identify existing view streams or generate new view streams that may be of interest to individual remote viewers.

Figure 4:
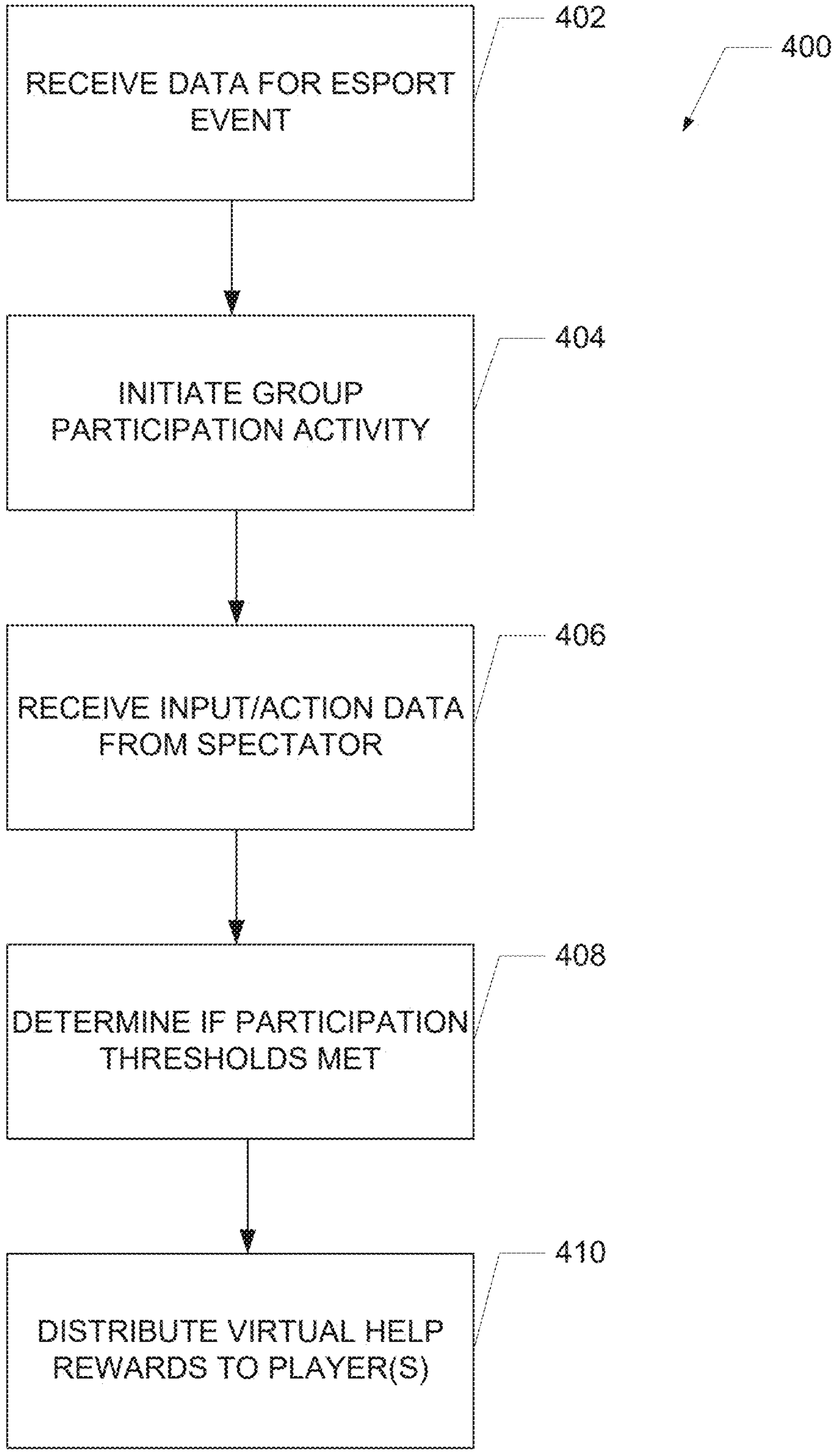
FIG. 4 is a flowchart illustrating an exemplary method for triggering virtual help based on audience participation tiers, according to one embodiment.

FIG. 4 is a flowchart illustrating an exemplary method 400 for triggering virtual help during the game based on spectator participation tiers.

At step 402, eSports event data is obtained regarding the eSports event. According to various aspects, the eSports event data includes data regarding the number of spectators viewing the eSport event, gameplay data generated during the event, including game status data that relates to the attributes, items, and status of each player's team or game character. In various aspects, the eSport event data may also include data regarding the player's or teams themselves, including but not limited historical game performance, win-loss records, popularity, music preferences, and emote preferences among others.

At step 404, a group participation activity is initiated. The group participation activity, generally indicated as 600 in FIG. 6, in allows the spectators to perform an action, such as pressing a button repeatedly at the user device 200, speaking, cheering, or yelling, performing some physical action that may be captured by the tracking device 224. Other actions may include sharing media, using hashtags, or scanning QR codes. According to various aspects, the spectator actions may further include participation thresholds for each spectator before the spectator's participation counts towards the group participation threshold. By way of example, each spectator may have to push a controller button a minimum number of times or in a specific sequence. Alternatively, each spectator must stand up and cheer or dance for a minimum amount of time.

According to one embodiment, the group participation activity may be active and available throughout the entire eSport event. In another embodiment, the group participation activity may be initiated based upon events occurring in the game. By way of example and not limitation, a group participation activity may be automatically initiated whenever one player or team scores a point, whenever the score is tied, or near the conclusion of the game (e.g. the final two minutes of a game).

The parameters for each group participation activity may differ, as such, the requirements for each activity and any time limits for the group participation activity may be displayed at each user device 200 or otherwise communicated to the spectators of the event. By way of example, the group participation activity may be presented as a pop-up or overlay message 604, as shown in FIG. 6

At step 406, data regarding the inputs or actions performed by the spectators is received at the spectator participation module 360. At step 408, the spectator participation module 360 may analyze the received data to determine which, if any, spectator participation thresholds have been satisfied and then to further determine which, if any group participation thresholds have been satisfied.

At step 410, the spectator participation module 360 generates or otherwise distributes the virtual help rewards to the corresponding team or player. According to various aspects, a lower tier virtual help reward may include an audio and/or visual cheer played or displayed in association with the corresponding team or player. In another aspect, a mid-tier virtual help reward, may be a helpful object, a hint, or a temporary boost to one or more in-game attributes. Higher tier virtual help rewards may include but are not limited permanent attribute boosts, high value objects or weapons, additional time to complete a task, or in some cases additional points. The exact nature of the rewards are highly dependent upon the game played at the eSport event. Moreover, as previously described, the virtual rewards may be varied in response to the game conditions such that exceeding very high group participation thresholds may result in the awarding of lower-value rewards.

In various aspects, steps 404-410 may be repeated throughout the eSport event. Furthermore, multiple instances of steps 402-410 may be performed simultaneously such that multiple group participation activities may occur simultaneously. As such, each spectator may be more engaged through the entirety of the eSports event.

Figure 5:
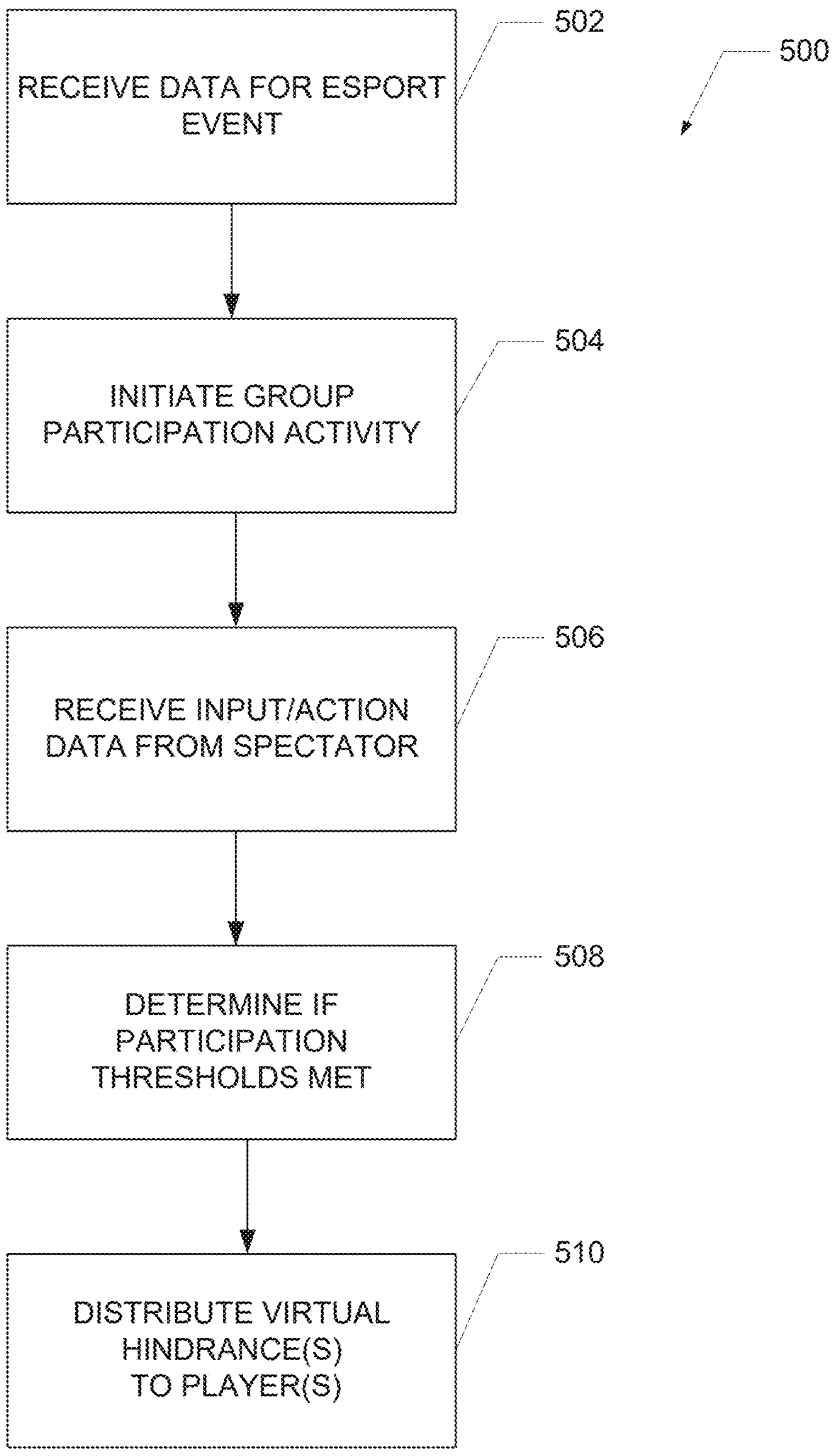
FIG. 5 is a flowchart illustrating an exemplary method for triggering virtual hindrance based on audience participation tiers, according to one embodiment.

FIG. 5 is a flowchart illustrating an exemplary method 500 for triggering a virtual hindrance during the game based on spectator participation tiers.

At step 502, eSports event data is obtained regarding the eSports event. According to various aspects, the eSports event data includes data regarding the number of spectators viewing the eSport event, gameplay data generated during the event, including game status data that relates to the attributes, objects, and status of each player's team or game character. In various aspects, the eSport event data may also include data regarding the player's or teams themselves, including but not limited historical game performance, win-loss records, popularity, music preferences, and emote preferences among others.

At step 504, a group participation activity is initiated. The group participation activity, generally indicated as 600 in FIG. 6, allows the spectators to perform an action, such as pressing a button repeatedly at the user device 200, speaking, cheering, or yelling, performing some physical action that may be captured by the tracking device 224. Other actions may include sharing media, using hashtags, or scanning QR codes. According to various aspects, the spectator actions may further include participation thresholds for each spectator before the spectator's participation counts towards the group participation threshold. By way of example, each spectator may have to push a controller button a minimum number of times or in a specific sequence. Alternatively, each spectator must stand up and cheer or dance for a minimum amount of time.

According to one embodiment, the group participation activity may be active and available throughout the entire eSport event. In another embodiment, the group participation activity may be initiated based upon events occurring in the game. By way of example and not limitation, a group participation activity may be automatically initiated whenever one player or team scores a point, whenever the score is tied, or near the conclusion of the game (e.g. the final two minutes of a game).

The parameters for each group participation activity may differ, as such, the requirements for each activity and any time limits for the group participation activity may be displayed at each user device 200 or otherwise communicated to the spectators of the event. By way of example, the group participation activity may be presented as a pop-up or overlay message 606, as shown in FIG. 6

At step 506, data regarding the inputs or actions performed by the spectators is received at the spectator participation module 360. At step 508, the spectator participation module 360 may analyze the received data to determine which, if any, spectator participation thresholds have been satisfied and then to further determine which, if any group participation thresholds have been satisfied.

At step 510, the spectator participation module 360 generates or otherwise distributes the virtual hindrance obstacle (s) to the corresponding team(s) or player(s). According to various aspects, a lower tier virtual hindrance obstacle or challenge may include an audio and/or visual cheer played or displayed in association with the corresponding team or player. In another aspect, a mid-tier virtual hindrance obstacle or challenge, may be a hindrance item, a hint, or a temporary boost to one or more in-game attributes. Higher tier virtual hindrance obstacle or challenges may include but are not limited permanent attribute boosts, high value objects or weapons, additional time to complete a task, or in some cases additional points. The exact nature of the rewards are highly dependent upon the game played at the eSport event. Moreover, as previously described, the virtual rewards may be varied in response to the game conditions such that exceeding very high group participation thresholds may result in the awarding of lower-value rewards.

In various aspects, steps 504-510 may be repeated throughout the eSport event. Furthermore, multiple instances of steps 502-510 may be performed simultaneously such that multiple group participation activities may occur simultaneously. As such, each spectator may be more engaged through the entirety of the eSports event.

The foregoing detailed description of the technology herein has been presented for purposes of illustration and description. It is not intended to be exhaustive or to limit the technology to the precise form disclosed. Many modifications and variations are possible in light of the above teaching. The described aspects were chosen in order to best explain the principles of the technology and its practical application to thereby enable others skilled in the art to best utilize the technology in various aspects and with various modifications as are suited to the particular use contemplated. It is intended that the scope of the technology be defined by the claim.

What is claimed is:

1. A system for generating custom views during an eSport event in response to spectator participation at one or more entertainment devices; the system comprising:
- a server having memory and a processor that executes instructions stored in memory, wherein execution of the instructions by the processor causes the server to:
  - initiate a group participation activity; wherein the group participation activity defines a threshold for a group participation response;
  - receive the group participation response from a camera device of the one or more entertainment devices;
  - distribute an in-game item to a player of the eSport event when the group participation response exceeds the threshold;
  - generate a custom view comprising event data of the eSport event after the in-game item is distributed to the player based on one or more views from one or more streams of the eSport event, wherein generating the custom view is based on metadata associated with the one or more streams and machine learning; and
  - provide the custom view over a communication network to at least one of the one or more entertainment devices.

2. The system of claim 1, wherein execution of instructions by the processor further causes the server to receive the event data and wherein generating the custom view includes applying machine learning to the event data and a profile preference of a participant.

3. The system of claim 1, wherein the at least one of the one or more entertainment devices receiving the custom view over the communication network captured the group participation response.

4. The system of claim 1, wherein the group participation activity is initiated based upon an event occurring in-game.

5. The system of claim 1, wherein the threshold is modified in response to gameplay of the eSport event.

6. The system of claim 1, wherein the threshold is modified in response to a number of spectators of the eSport event.

7. A method for generating custom views during an eSport event in response to spectator participation at one or more entertainment devices, the method comprising:
- initiating a group participation activity; wherein the group participation activity defines a threshold for a group participation response;
- receiving the group participation response from a camera device of the one or more entertainment devices;
- distributing an in-game item to a player of the eSport event when the group participation response exceeds the threshold;
- generating a custom view comprising event data of the eSport event after the in-game item is distributed to the player based on one or more views from one or more streams of the eSport event, wherein generating the custom view is based on metadata associated with the one or more streams and machine learning; and
- providing the custom view over a communication network to at least one of the one or more entertainment devices.

8. The method of claim 7, further comprising receiving the event data and wherein generating the custom view includes applying machine learning to the event data and a profile preference of a participant.

9. The method of claim 7, wherein the at least one of the one or more entertainment devices receiving the custom view over the communication network captured the group participation response.

10. The method of claim 7, wherein the group participation activity is initiated based upon an event occurring in-game.

11. The method of claim 7, wherein the threshold is modified in response to gameplay of the eSport event.

12. The method of claim 7, wherein the threshold is modified in response to a number of spectators of the eSport event.

13. A non-transitory computer-readable storage medium having embodied thereon a program, the program being executable by a processor to perform a method for generating custom views during an eSport event in response to spectator participation at one or more entertainment devices, the method comprising:

initiating a group participation activity; wherein the group participation activity defines a threshold for a group participation response;

receiving the group participation response from a camera device of the one or more entertainment devices;

distributing an in-game item to a player of the eSport event when the group participation response exceeds the threshold;

generating a custom view comprising event data of the eSport event after the in-game item is distributed to the player based on one or more views from one or more streams of the eSport event, wherein generating the custom view is based on metadata associated with the one or more streams and machine learning; and providing the custom view over a communication network to at least one of the one or more entertainment devices.

14. The non-transitory computer-readable storage medium of claim 13, further comprising receiving the event data and wherein generating the custom view includes applying machine learning to the event data and a profile preference of a participant.

15. The non-transitory computer-readable storage medium of claim 13, wherein the at least one of the one or more entertainment devices receiving the custom view over the communication network captured the group participation response.

16. The non-transitory computer-readable storage medium of claim 13, wherein the group participation activity is initiated based upon an event occurring in-game.

17. The non-transitory computer-readable storage medium of claim 13, wherein the threshold is modified in response to gameplay of the eSport event.

* * * * *